United States Patent [19]

Wichtel

[11] Patent Number: 5,638,078

[45] Date of Patent: Jun. 10, 1997

[54] ARRANGEMENT FOR PROVIDING COMMUNICATION AND POSITIONING IN A GUIDANCE INSTALLATION

[75] Inventor: Erik Wichtel, Malmo, Sweden

[73] Assignee: Telia AB, Farsta, Sweden

[21] Appl. No.: 333,300

[22] Filed: Nov. 1, 1994

[30] Foreign Application Priority Data

Nov. 8, 1993 [SE] Sweden .................. 9303667

[51] Int. Cl.$^6$ .................................................. G01S 3/02
[52] U.S. Cl. ................ 342/450; 342/357; 364/449.1
[58] Field of Search ................... 342/357, 450; 364/449, 460

[56] References Cited

U.S. PATENT DOCUMENTS

| | | | |
|---|---|---|---|
| 4,896,580 | 1/1990 | Rudnicki | 89/1.815 |
| 5,129,605 | 7/1992 | Burns et al. | 246/5 |
| 5,311,194 | 5/1994 | Brown | 342/357 |
| 5,470,233 | 11/1995 | Fruchterman et al. | 434/112 |
| 5,491,636 | 2/1996 | Robertson et al. | 364/432 |
| 5,524,081 | 6/1996 | Paul | 364/460 |

*Primary Examiner*—Thomas H. Tarcza
*Assistant Examiner*—Dao L. Phan
*Attorney, Agent, or Firm*—Oblon, Spivak, McClelland, Maier & Neustadt, P.C.

[57] ABSTRACT

Communication and positioning device for guidance installation for guiding mobile units on a track system. The positioning is carried out with great accuracy. Base stations placed along the track system are used for communication and positioning. Communication between the mobile units and base stations is carried out by way of a mobile radio system (DECT). Positioning is established by means of positioning equipment included in the mobile unit. On passage of a mobile unit past a base station, the positioning equipment of the mobile unit is updated with the aid of reference positioning equipment. This updating is carried out by way of a mobile radio system.

12 Claims, 2 Drawing Sheets

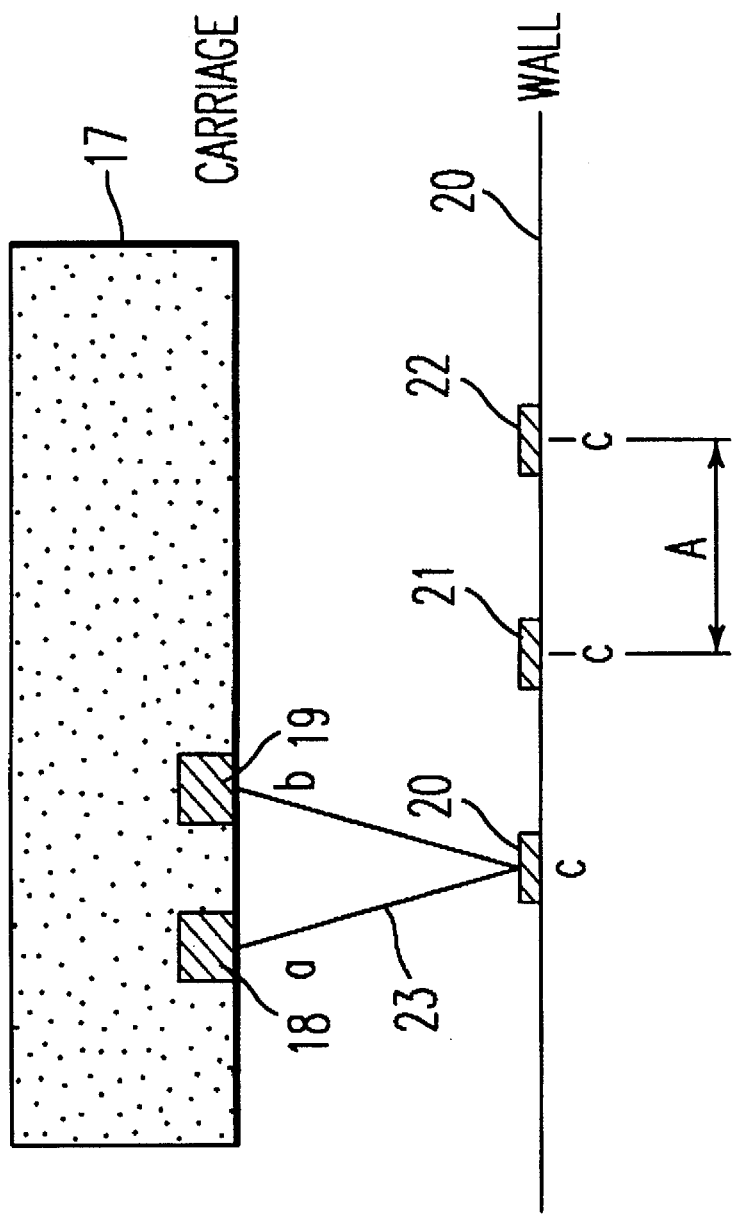

ARRANGEMENT FOR PROVIDING COMMUNICATION AND POSITIONING IN A GUIDANCE INSTALLATION

BACKGROUND OF THE INVENTION

1. Field of the Invention

The present invention relates to an arrangement for providing communication and positioning for a guidance installation for guiding mobile units, for example in the form of carriages in a track system. The positioning is intended to occur with great accuracy, for example with the accuracy of approximately one meter. A respective mobile unit and track stations placed along the track system comprise first and respectively second equipment for the communication and positioning.

2. Discussion of the Background

Guidance systems for track systems for collective traffic of the type In question today cost an estimated 10 million crowns/kilometer and the wages of the carriage drivers are more than half of the operating costs. It is thus of interest to provide solutions for positioning and communication for guidance systems which will make it possible to have driverless carriages. In connection with this, it has been discussed that a data bus will be installed along the track and two-way short-range communication units will be installed in a number of about 1/m. The intention is here to provide identity and certain logic information at distances of one decimeter. A respective carriage is thus positioned every meter and is given certain capabilities for communicating.

Existing solutions for positioning and communication are relatively primitive. There are two types of system in this respect. The first system operates with fixed blocks and the second system operates with moving blocks. Fixed blocks involve the track being divided up into sections where only one train unit is allowed at a time. A collector shoe which shortcircuits two metal rails constitutes a detector. Such systems are supplied and are obtainable on the market. The principle with moving blocks involves the train being surrounded by a safety area within which no other trains are allowed.

SUMMARY OF THE INVENTION

There exists quite generally a requirement for being able to arrange guidance and track systems in a technically/economically more advantageous manner. The invention solves this problem, among others.

There is thus a requirement for positioning a respective carriage with the precision of one meter and for providing general data communication between carriage and infrastructure. The invention also solves this problem.

The solution to the problem will be able to be implemented within the short term and entail a technical design which is as simple as possible and costs which are as low as possible. Since the carriages are to be made driverless, the reliability of the system is to be high. The invention solves this problem.

There is thus a requirement that accurate positionings can be carried out continuously and that even smaller train units (carriages) can be driven at closer intervals. The invention also solves this problem.

In connection with positioning and guidance of guidance systems of the type in question, there is a requirement for being able to set up telecommunication connections which can be used by the passengers. This is solved by the present invention.

Solution

The feature which can be mainly considered as characterizing an arrangement according to the invention is that for the establishment of communication between respective first and second equipment, a telephone system is arranged comprising a mobile radio system and/or fixed telephone network system. For establishing the positioning, the respective mobile unit or carriage contains a positioning equipment, preferably a positioning equipment of the GPS (Global Position System) type which, when the mobile unit passes a respective base station, can be updated by a reference positioning equipment. The latter updating of the positioning equipment of the mobile unit or carriage can be effected via the telephone system.

In one embodiment, the functions for communication and positioning are thus separated. Communication occurs via base stations arranged at a distance of approximately 100 meters from one another along a respective track or track sections. The positioning occurs by means of mainly radio-based positioning tools which can be of a type known per se.

In a further embodiment, reference positioning equipment consisting of a fixed calibrated GPS reference station arranged to calculate corrections for differential GPS is utilized in open, half-open track sections or long sections. The mobile units or carriages are provided with mobile GPS receivers which calculate the positions running with a precision, for example with a precision of 100 meters, which significantly exceeds the precision aimed at with the system, which can be a precision of approximately 1 meter. Data from the fixed calibrated reference station are arranged to correct the mobile receivers to the last-mentioned accuracy, the installation alongside the track across the communication system being rendered unnecessary.

In covered track sections and shorter sections with a need for maximum continuity in the positioning, dead reckoning function takes over from preferably the last-obtained approved position calculated from the positioning equipment which operates with open, half-open track sections or long sections. The system thereby operates with information about which track section or sections is/are the subject of a dead reckoning function or dead reckoning functions.

The telecommunication network preferably includes or consists of a mobile radio system of the DECT type which offers general data transmission, good accessibility, flexibility, hand-over function, roaming, simplicity, private operator structure, etc. The telecommunication network thus comprises a mobile radio network of the DECT type which offers public speech access on idle channels and which thereby provides the possibility for one or more additional services. The positioning part obtains assistance from the communication part which, according to the above, is established with telecommunication networks of the DECT type for being updated with corrections for differential GPS which makes the position of the mobile unit known with an accuracy of approximately one meter. The said telecommunication networks are utilized for communicating position, status and so forth to the guidance system. The guidance system is arranged to provide instructions to the mobile unit/carriage via the said telecommunication networks of the DECT type.

In a concrete embodiment, a respective mobile unit is provided with an internal guidance system, a portable unit which can be used in the current telecommunication network of the DECT type, and a GPS unit. Base stations in the telecommunication network of the said type are connected or can be connected to the fixed telecommunication network. The fixed telecommunication network is connected to a central guidance system for the track system and a reference equipment of the differential GPS type.

That which has been proposed above provides a possibility through differential GPS of obtaining a sufficiently good positioning accuracy. Telecommunication networks of the DECT type or similar systems are suitable for data transmission in the given context. The basic functions are thus ensured. For the transmission of position data, networks of the GSM, NaT, MOBITEX type and even fixed networks such as PSTN (data network) can be used besides the said DECT network. Known technical solutions can be combined for obtaining a result which is satisfactory in this context.

BRIEF DESCRIPTION OF THE DRAWINGS

A presently proposed embodiment of an arrangement which exhibits the characteristics indicative of the invention will be described in the text below, at the same time referring to the attached drawings, in which:

FIG. 3 shows, from above, equipment for so-called dead reckoning.

DESCRIPTION OF THE PREFERRED EMBODIMENTS

Figure 1:
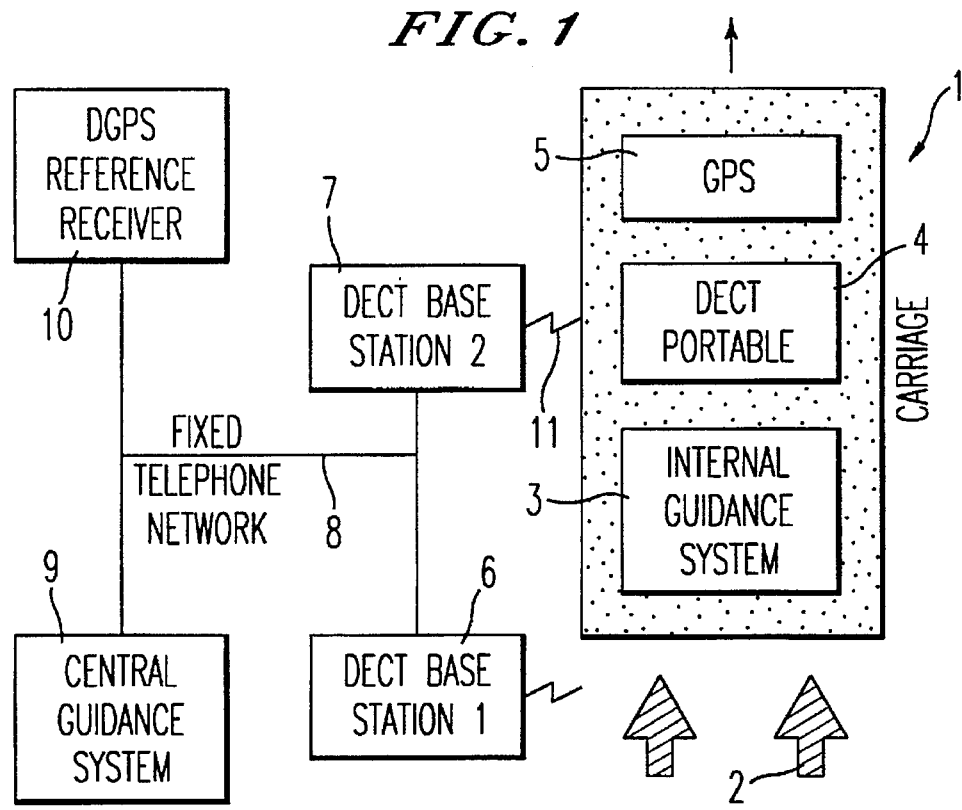
FIG. 1 shows, in block diagram form, a mobile unit or carriage which is passing base stations contained in a mobile radio network and which is connected to the public telephone network, via which a central guidance system and a reference equipment for positioning are included or are connected.

In FIG. 1, a mobile unit or a carriage is specified by 1. The carriage can be track-hound and is intended to be driven in a track system (not specifically shown) of a type known per se. In the track system, several carriages or trains can be driven at the same time as accurate positioning and guidance can be effected for the carriage in the track system. The carriage moves in a direction specified by arrows 2. The carriage comprises or is provided with a first equipment consisting of an internal guidance system 3, a mobile unit 4 belonging to a mobile radio network of the DECT type, and positioning equipment 5 of the GPS type. A current communication system of the DECT type is represented in the figure through its base stations 6 and 7. The base stations are arranged, for example, at approximately 100 meter intervals. The carriage passes the base stations as they come up, and in FIG. 1 the carriage has passed base station 6 and is in communication with base station 7. The base stations are included An or connected to a fixed telephone network which is represented by connections 8. Connected to the fixed telephone network or telecommunication network is a central guidance system 9 by means of which the carriages in the track system in question can be centrally guided. Guidance of the carriages is individual and communication from the central guidance system to the internal guidance system occurs via the said telecommunication network. Also connected to the fixed telecommunication network is a reference receiver for the positioning function. The reference receiver is of the digital GPS type (DGPS). The fixed calibrated reference receiver corrects the GPS equipment of the carriage as the carriage passes. Communication between a respective base station and the carriage is represented by 11.

The structure specified in FIG. 1 represents a track system for collective traffic. The system can be applied to driverless rail traffic in densely populated areas with small carriages which run at relatively low speed, for example a speed of 60 km/h or normally 40 km/h and make frequent stops. A half-open environment, that is to say one underground with admission of light and air, or a completely open environment would probably be most usual in a future system of this type. Environmental and cost reasons point to this. Moreover, the GPS system requires that the proportion of wholly covered sections be limited along a respective track for the system to operate well. A solution based on DECT also gives as additional effect the possibility to serve as access network for public telephony in a collective traffic environment.

Figure 2:
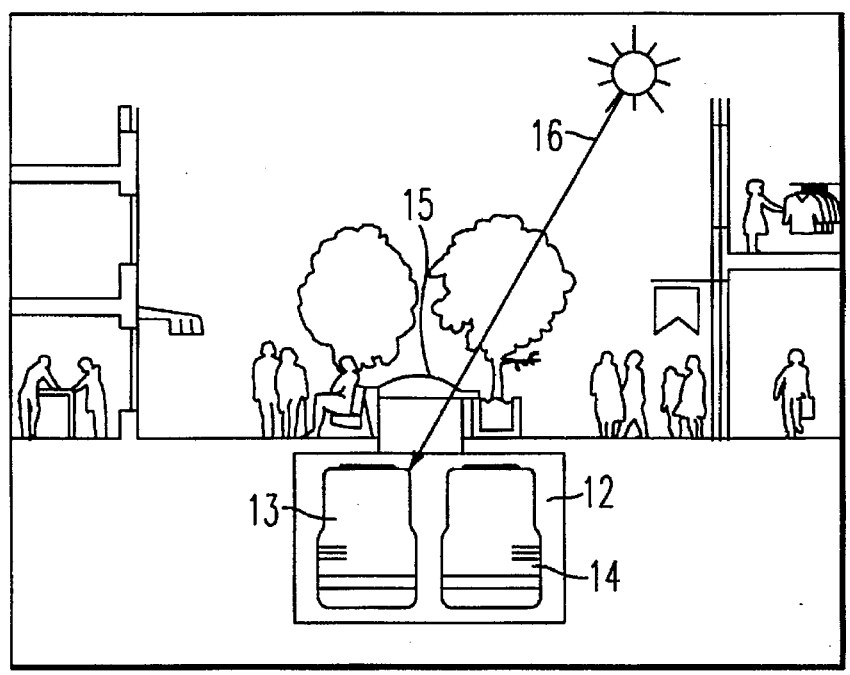
FIG. 2 shows, in an essentially vertical section, a shallow tunnel with openings for light ingress.

FIG. 2 shows a shallow tunnel of the said type. The tunnel is designated by 12 and two carriages or trains which are passing each other are designated by 13 and 14. The openness of the tunnel or system is represented by a transparent roof 15 which provides access for the rays of the sun and light 16.

FIG. 3 shows the case with so-called dead reckoning which is utilized in covered tunnels or for short sections. In FIG. 3, a carriage is shown by 17. The carriage includes a transmitter 18 and a detector 19. Reflectors 20, 21 and 22 are arranged at a certain distance from one another on the tunnel wall 20. Dead reckoning is a collective name for all methods which are used for determining position on the basis of a locally known position where different types of sensor, for example sensors 20, 21 and 22 make it possible to calculate a movement. This provides very good precision initially, but the precision is progressively degraded. Due to the progressive degradation, the dead reckoning system must be upgraded or calibrated from the outside at uniform intervals. A traditional and reliable method is inertial navigation (IN). Inertial navigation operates remarkably well for this application. A less expensive way is a combination of wheel sensors and compass. However, locked wheels are normal in rail traffic, which is why such a method is not suitable in all cases occurring.

The solution shown in FIG. 3 provides a specially designated optical solution with simple passive reflectors 20, 21 and 22 which provide pulses to a sensor when passed every meter. The transmitter 18 can consist of a laser and transmits a continuous light beam 23. The number of passages is calculated by the detector 19. As a result, it is known which reflector is passed, and this provides the position (already measured earlier). The said passive plastic reflectors are installed at a short distance from one another along the track where the dead reckoning function is considered to operate. Such a distance A can be approximately 1 meter.

The invention is not restricted to the embodiment shown as an example above but can be subjected to modifications within the scope of the subsequent claims and concept of the invention.

I claim:

1. Arrangement for providing communication and accurate positioning to a guidance installation for guiding mobile units on a track system, said communication and positioning being established between said mobile units and base stations placed along the track system, comprising:

a telecommunications system for establishing communication between said mobile units and said base stations, including a telecommunication network;

positioning equipment of the GPS type, for establishing a position of said mobile units, which on passage of the mobile unit past a base station can be updated by reference positioning equipment, the updating of the positioning equipment in the mobile unit by the reference position equipment being effected by way of the telecommunication system.

2. Arrangement according to claim 1, characterized in that the functions for communication and positioning are separated, that the communication occurs via base stations arranged at a distance of approximately 100 meters from one another and the positioning occurs by means of mainly radio-based positioning tools which can be of the traditional type.

3. Arrangement according to claim 1 or 2, characterized in that in open, half-open track sections or long sections, the reference positioning equipment consists of a fixed calibrated GPS reference station arranged to calculate corrections for differential GPS, and that the mobile units are provided with mobile GPS receivers which calculate the positions running at a precision, which significantly exceeds the precision aimed for in the system and that data from the fixed calibrated reference station are arranged for correcting the mobile receivers to the higher accuracy, whereby the installation along the track along the communication system is rendered unnecessary.

4. Arrangement according to claim 1 or 2, characterized in that in the case of covered track sections and shorter sections with requirements for maxima or high continuity, a dead reckoning function takes over from preferably the last-obtained valid position calculated from the positioning equipment which operates in the case of open, half-open track sections or long sections, the system also operating with information about which track sections are the subject of a dead reckoning function.

5. Arrangement according to claim 1 or 2, characterized in that the telecommunication network includes a mobile radio system of the DECT type which offers general data transmission, and good accessibility, flexibility, hand-over, roaming, simplicity, private operator instruction, etc.

6. Arrangement according to claim 1 or 2, characterized in that the telecommunication network comprises a mobile radio network of the DECT type which offers public speech access on idle channels and which therefore makes it possible to have additional services.

7. Arrangement according to claim 1 or 2, characterized in that the positioning part obtains assistance from the communication part which is established, with a telecommunication network of the DECT type for being updated with corrections for differential GPS which makes the position of the mobile unit known with an accuracy of approximately one meter, and that the said telecommunication network is utilized for informing the guidance system of position, status etc, and the guidance system gives the respective mobile unit instruction via the said telecommunication network on passage of one or more base stations.

8. Arrangement according to claim 1 or 2, characterized in that a respective mobile unit is provided with an internal guidance system, a portable unit in a current telecommunication network of the DECT type, and a GPS unit.

9. Arrangement according to claim 1 or 2, characterized in that base stations in the telecommunication network of the DECT type are connected to the fixed telecommunication network.

10. Arrangement according to claim 1 or 2, characterized in that a central guidance system and reference equipment of the differential GPS type are connected to the fixed telecommunication network.

11. Arrangement according to claim 1, where said telecommunication network is a mobile radio system.

12. Arrangement according to claim 1, where said telecommunication network is a fixed telecommunication network.

* * * * *